United States Patent

Mizutani et al.

[11] 3,862,174
[45] Jan. 21, 1975

[54] CYCLOPROPANECARBOXYLATES

[75] Inventors: Toshio Mizutani; Nobushige Itaya; Nobuo Ohno, all of Osaka; Takashi Matsuo, Amagasaki; Shigeyoshi Kitamura; Yositosi Okuno, both of Osaka, all of Japan

[73] Assignee: Sumitomo Chemical Company, Limited, Osaka-fu, Japan

[22] Filed: June 26, 1972

[21] Appl. No.: 266,046

[52] U.S. Cl.... 260/240 R, 260/330.5, 260/332.2 R, 260/346.2 R, 260/468 H, 424/275, 424/285, 424/306
[51] Int. Cl............................................. C07d 5/14
[58] Field of Search...... 260/347.4, 332.2 R, 468 H, 260/346.2 R, 330.5, 240 R

[56] References Cited
FOREIGN PATENTS OR APPLICATIONS
2,109,010   9/1971   Germany Primary Examiner—Henry R. Jiles
Assistant Examiner—Bernard Dentz
Attorney, Agent, or Firm—Craig & Antonelli

[57] ABSTRACT

A cyclopropanecarboxylate of the formula:

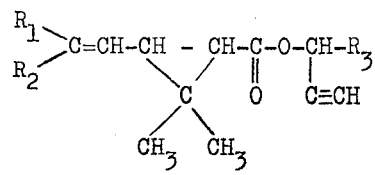

wherein $R_1$ is methyl, $R_2$ is lower alkoxymethyl, lower alkenoxymethyl, lower alkynoxymethyl or acyl such as lower alkanoyl, lower alkenylcarbonyl or lower alkynylcarbonyl or, when taken together with the adjacent carbon atom, $R_1$ and $R_2$ may represent a cyclic ketone group preferably having 4 to 6 carbon atoms and $R_3$ is a group of the formula:

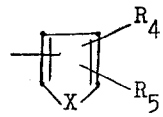

[wherein $R_4$ is lower alkyl, lower alkenyl, lower alkynyl, benzyl, thenyl, furylmethyl, phenoxy or phenythio, $R_5$ is hydrogen or lower alkyl or $R_4$ and $R_5$ may link together to form a polymethylene chain preferably having 3 to 4 carbon atoms and X is oxygen, sulfur or vinylene] or a group of the formula:

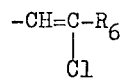

[wherein $R_6$ is benzyl, thenyl or furylmethyl], which is useful as an insecticide characteristic in exerting rapidly the insecticidal activity against various harmful insects.

26 Claims, No Drawings

CYCLOPROPANECARBOXYLATES

The present invention relates to novel cyclopropanecarboxylates and their production and use.

In this specification, the term "lower" is intended to mean the one having not more than 8 carbon atoms.

The said cyclopropanecarboxylates are representable by the formula:

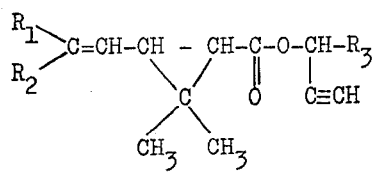

[I]

wherein $R_1$ is methyl, $R_2$ is lower alkoxymethyl (e.g. methoxymethyl, ethoxymethyl, propoxymethyl), lower alkenoxymethyl (e.g. allyloxymethyl, pentenyloxymethyl), lower alkynoxymethyl (e.g. propargyloxymethyl) or acyl such as lower alkanoyl (e.g. acetyl, propionyl, butyryl), lower alkenylcarbonyl (e.g. allylcarbonyl) or lower alkynylcarbonyl (e.g. propargylcarbonyl) or, when taken together with the adjacent carbon atom, $R_1$ and $R_2$ may represent a cyclic ketone group preferably having 4 to 6 carbon atoms and $R_3$ is a group of the formula:

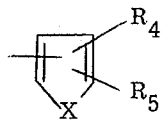

[wherein $R_4$ is lower alkyl (e.g. methyl, ethyl, propyl), lower alkenyl (e.g. allyl, pentenyl), lower alkynyl (e.g. propargyl), benzyl, thenyl, furylmethyl, phenoxy or phenylthio, $R_5$ is hydrogen or lower alkyl (e.g. methyl, ethyl, propyl) or $R_4$ and $R_5$ may link together to form a polymethylene chain preferably having 3 to 4 carbon atoms and X is oxygen, sulfur or vinylene] or a group of the formula:

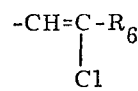

[wherein $R_6$ is benzyl, thenyl or furylmethyl].

The cyclorpopanecarboxylates [I] have stereoisomers due to the stereo structure and optical isomers due to the asymmetric carbon atom, and all of these isomers are within the scope of the invention.

Specific examples of the cyclopropanecarboxylate [I] are shown in Table 1.

| No. | Name | Formula |
|---|---|---|
| 1 | 5-Benzyl-3-(α-ethynyl)-furylmethyl 2',2'-dimethyl-3'-(2''-methoxymethyl-1''-propenyl)-cyclopropanecarboxylate | |
| 2 | 5-(2'-Thenyl)-3-(α-ethynyl)-furylmethyl 2'',2''-dimethyl-3''-(2'''-methoxymethyl-1'''-propenyl)-cyclopropanecarboxylate | |
| 3 | 5-Benzyl-2-(α-ethynyl)-thenyl 2',2'-dimethyl-3'-(2''-methoxymethyl-1''-propenyl)-cyclopropanecarboxylate | |
| 4 | 3-Benzyl-α-ethynylbenzyl 2',2'-dimethyl-3'-(2''-methoxymethyl-1''-propenyl)-cyclopropanecarboxylate | |
| 5 | 5-Propargyl-α-ethynylfurfuryl 2',2'-dimethyl-3'-(2''-methoxymethyl-1''-propenyl)-cyclopropanecarboxylate | |
| 6 | 5-Propargyl-2-(α-ethynyl)-thenyl 2',2'-dimethyl-3'-(2''-methoxymethyl-1''-propenyl)-cyclopropanecarboxylate | |
| 7 | 5-Allyl-α-ethynylfurfuryl 2',2'-dimethyl-3'-(2''-methoxymethyl-1''-propenyl)-cyclopropanecarboxylate | |

Table I—Continued

| No. | Name | Formula |
|---|---|---|
| 8 | 4,5-Dimethyl-α-ethynylfurfuryl 2',2'-dimethyl-3'-(2''-methoxymethyl-1''-propenyl)-cyclopropanecarboxylate | (structural formula) |
| 9 | 4,5-Tetramethylene-α-ethynylfurfuryl 2',2'-dimethyl-3'-(2''-methoxymethyl-1''-propenyl)-cyclopropanecarboxylate | (structural formula) |
| 10 | 2-Methyl-5-propargyl-3-(α-ethynyl)-furylmethyl 2',2'-dimethyl-3'-(2''-methoxymethyl-1''-propenyl)-cyclopropanecarboxylate | (structural formula) |
| 11 | 3-Phenoxy-α-ethynylbenzyl 2',2'-dimethyl-3'-(2''-methoxymethyl-1''-propenyl)-cyclopropanecarboxylate | (structural formula) |
| 12 | 3-Phenylthio-α-ethynylbenzyl 2',2'-dimethyl-3'-(2''-methoxymethyl-1''-propenyl)-cyclopropanecarboxylate | (structural formula) |
| 13 | 5-Chloro-6-phenylhexa-4-ene-1-yne-3-yl 2',2'-dimethyl-3'-(2''-methoxymethyl-1''-propenyl)-cyclopropanecarboxylate | (structural formula) |
| 14 | 5-Chloro-6-(2'-thienyl)-hexa-4-ene-1-yne-3-yl 2'',2''-dimethyl-3''-(2'''-methoxymethyl-1'''-propenyl)-cyclopropanecarboxylate | (structural formula) |
| 15 | 5-Propargyl-α-ethynylfurfuryl 2',2'-dimethyl-3'-(2''-ethoxymethyl-1''-propenyl)-cyclopropanecarboxylate | (structural formula) |
| 16 | 5-Propargyl-α-ethynylfurfuryl 2',2'-dimethyl-3'-(2''-isopropyloxymethyl-1''-propenyl)-cyclopropanecarboxylate | (structural formula) |
| 17 | 5-Propargyl-α-ethynylfurfuryl 2',2'-dimethyl-3'-(2''-propargyloxymethyl-1''-propenyl)-cyclopropanecarboxylate | (structural formula) |
| 18 | 5-Propargyl-α-ethynylfurfuryl 2',2'-dimethyl-3'-(2''-allyoxymethyl-1''-propenyl)-cyclopropanecarboxylate | (structural formula) |
| 19 | 5-Benzyl-3-(α-ethynyl)-furylmethyl 2',2'-dimethyl-3'-(2''-acetyl-1''-propenyl)-cyclopropanecarboxylate | (structural formula) |

Table 1—Continued

| No. | Name | Formula |
|---|---|---|
| 20 | 5-Benzyl-2-(α-ethynyl)-thenyl 2',2'-dimethyl-3'-(2"-acetyl-1"-propenyl)-cyclopropanecarboxylate | |
| 21 | 5-Propargyl-α-ethynylfurfuryl 2',2'-dimethyl-3'-(2"-acetyl-1"-propenyl)-cyclopropanecarboxylate | |
| 22 | 2-Methyl-5-propargyl-3-(α-ethynyl)furylmethyl 2',2'-dimethyl-3'-(2"-acetyl-1"-propenyl)-cyclopropanecarboxylate | |
| 23 | 4,5-Trimethylene-2-(α-ethynyl)-thenyl 2',2'-dimethyl-3'-(2"-acetyl-1"-propenyl)-cyclopropanecarboxylate | |
| 24 | 3-Phenoxy-α-ethynylbenzyl 2',2'-dimethyl-3'-(2"-acetyl-1"-propenyl)-cyclopropanecarboxylate | |
| 25 | 3-Phenylthio-α-ethynylbenzyl 2',2'-dimethyl-3'-(2"-acetyl-1"-propenyl)-cyclopropanecarboxylate | |
| 26 | 5-Propargyl-α-ethynylfurfuryl 2',2'-dimethyl-3'-(2"-ethylcarbonyl-1"-propenyl)-cyclopropanecarboxylate | |
| 27 | 5-Propargyl-α-ethynylfurfuryl 2',2'-dimethyl-3'-(2"-isopropylcarbonyl-1"-propenyl)-cyclopropanecarboxylate | |
| 28 | 5-Propargyl-α-ethynylfurfuryl 2',2'-dimethyl-3'-(2"-ethynylcarbonyl-1"-propenyl)-cyclopropanecarboxylate | |
| 29 | 5-Propargyl-α-ethynylfurfuryl 2',2'-dimethyl-3'-(2"-vinylcarbonyl-1"-propenyl)-cyclopropanecarboxylate | |

Table 1—Continued

| No. | Name | Formula |
|---|---|---|
| 30 | 5-Propargyl-α-ethynylfurfuryl 2',2'-dimethyl-3'-(2"-propargylcarbonyl-1"-propenyl)-cyclopropanecarboxylate | |
| 31 | 5-Propargyl-α-ethynylfurfuryl 2',2'-dimethyl-3'-(2"-allylcarbonyl-1"-propenyl)-cyclopropanecarboxylate | |
| 32 | 5-Propargyl-α-ethynylfurfuryl 2',2'-dimethyl-3'-(cyclopentanone-2"-ylidenemethyl)-cyclopropanecarboxylate | |
| 33 | 5-Propargyl-α-ethynylfurfuryl 2',2'-dimethyl-3'-(cyclohexanone-2"-ylidenemethyl)-cyclopropanecarboxylate | |

The cyclopropanecarboxylates [I] are novel and have an excellent insecticidal activity with a low toxicity to mammals. It is particularly notable that, compared with conventional insecticides as structurally related, they exert rapidly the insecticidal activity. Some of the test results which support the excellent insecticidal activity of the cyclopropanecarboxylates [I] are as follows:

TEST 1

The cyclopropanecarboxylates [I] (Compounds Nos. 1, 3, 5, 19 and 21), the corresponding chrysanthemumates and pyrethrates and some other structurally related compounds were each dispersed in deodorized kerosene to make an oil preparation containing a certain concentration of the active ingredient.

In a glass chamber of 70 cm cube, 20 adults of housefly were released, and 0.7 ml of the oil preparation was uniformly sprayed therein by the use of a glass made atomizer with a pressure of 1.5 kg/cm². The number of knockdown houseflies with the elapse of time was counted, and the KT$_{50}$ value (the time until 50% of the tested houseflies were knocked down) was calculated. The results are shown in Table 2.

Table 2

| Test compound | Active ingredient concentration (%) | KT$_{50}$ (seconds) |
|---|---|---|
| Cyclopropanecarboxylate [I] (Compound No. 1) | 0.1 | 109 |
| | 0.2 | 89 |
| Cyclopropanecarboxylate [I] (Compound No. 19) | 0.1 | 100 |
| 5-Bencyl-3-(αethynyl)-furylmethyl chrysanthemumate | 0.1 | 293 |
| 5-Benzyl-3-furylmethyl chrysanthemumate | 0.1 | 400 |
| | 0.5 | 164 |

Table 2—Continued

| Test compound | Active ingredient concentration (%) | KT$_{50}$ (seconds) |
|---|---|---|
| 5-benzyl-3-furylmethyl 2',2'-dimethyl-3'-(2"-methoxymethyl-1"-propenyl)-cyclopropanecarboxylate | 0.1 | 148 |
| | 0.2 | 107 |
| 5-Benzyl-3-furylmethyl 2',2'-dimethyl-3'(2"-acetyl-1"-propenyl)-cyclopropanecarboxylate | 0.1 | 120 |
| Cyclopropanecarboxylate [I] (Compound No. 3) | 0.2 | 175 |
| 5-Benzyl-α-ethynylthenyl chrysanthemumate | 0.2 | 240 |
| 5-Benzylthenyl chrysanthemumate | 0.2 | 437 |
| 5-Benzylthenyl 2',2'-dimethyl-3'-(2"-methocymethyl-1"'-propenyl)-cyclopropanecarboxylate | 0.2 | 205 |
| Cyclopropanecarboxylate [I] (Compound No. 5) | 0.1 | 102 |
| Cyclopropanecarboxylate [I] (Compound No. 21) | 0.1 | 95 |
| 5-Propargyl-α-ethynylfurfuryl chrysanthemumate | 0.1 | 125 |
| 5-Propargyl-α-ethynylfurfuryl pyrethrate | 0.1 | 110 |
| 5-Propargylfurfuryl chrysanthemumate | 0.1 | 212 |
| 5-Propargylfurfuryl 2',2'-dimethyl-3'-(2"-dimethoxymethyl-1"-propenyl)-cyclopropanecarboxylate | 0.1 | 136 |
| Allethrin | 0.1 | 264 |

TEST 2

The cyclopropanecarboxylates [I] (Compound Nos. 1, 5, 6, 9, 10, 17, 24, 28, 31 and 32), the corresponding chrysanthemumates and pyrethrates and some other structurally related compounds were each dispersed in deodorized kerosene to make an oil preparation containing a certain concentration of the active ingredient.

In a glass chamber of 70 cm cube, 20 adults of mosquito were released, and 0.7 ml of the oil preparation was uniformly sprayed therein by the use of a glass made atomizer with a pressure of 1.5 kg/cm$^2$. The number of knockdown mosquitos with the elapse of time was counted. After 10 minutes, the knockdown mosquitos were collected and, with feeding, allowed to stand for one day. The number of death was counted. The $KT_{50}$ value and the percent death were calculated. The results are shown in Table 3.

Table 3

| Test compound | Active ingredient concentration (%) | $KT_{50}$ (sec.) | Percent death (%) |
|---|---|---|---|
| Cyclopropanecarboxylate [I] (Compound No. 1) | 0.1 | 102 | 100 |
| 5-Benzyl-3-(α-ethynyl)-furylmethyl chrysanthemumate | 0.1 | 394 | 85 |
| 5-Benzyl-3-(α-ethynyl)-furylmethyl pyrethrate | 0.1 | 305 | 37 |
| 5-Benzyl-3-furylmethyl chrysanthemumate | 0.1 | 360 | 100 |
| 5-Benzyl-3-furylmethyl 2',2'-dimethyl-3'-(2''-methoxymethyl-1''-propenyl)-cyclopropane-carboxylate | 0.1 | 120 | 100 |
| 5-Benzyl-3-furylmethyl pyrethrate | 0.1 | 262 | 81 |
| Cyclopropanecarboxylate [I] (Compound No. 5) | 0.1 | 92 | 100 |
| Cyclopropanecarboxylate [I] (Compound No. 17) | 0.1 | 110 | 99 |
| Cyclopropanecarboxylate [I] (Compound No. 28) | 0.1 | 103 | 100 |
| Cyclopropanecarboxylate [I] (Compound No. 31) | 0.1 | 100 | 100 |
| Cyclopropanecarboxylate [I] (Compound No. 32) | 0.1 | 107 | 100 |
| 5-Propargyl-α-ethynylfurfuryl chrysanthemumate | 0.1 | 120 | 96 |
| 5-Propargylfurfuryl chrysanthemumate | 0.1 | 248 | 92 |
| 5-Propargylfurfuryl chrysanthemumate | 0.2 | 132 | 100 |
| 5-Propargylfurfuryl 2',2'-dimethyl-3'-(2''-methoxymethyl-1''-propenyl)-cyclopropane-carboxylate | 0.1 | 196 | 95 |
| Cyclopropanecarboxylate [I] (Compound No. 6) | 0.2 | 70 | 100 |
| 5-Propargyl-α-ethynylthenyl chrysanthemumate | 0.2 | 88 | 100 |
| 5-Propargyl-2-thenyl chrysanthemumate | 0.2 | 148 | 98 |
| Cyclopropanecarboxylate [I] (Compound No. 9) | 0.2 | 206 | 100 |
| 4,5-Tetramethylene-α-ethynyl-furfuryl chrysanthemumate | 0.2 | 315 | 100 |
| 4,5-Tetramethylenefurfuryl chrysanthemumate | 0.2 | 352 | 92 |
| Cyclopropanecarboxylate [I] (Compound No. 10) | 0.2 | 64 | 100 |
| 2-Methyl-5-propargyl-3-(α-ethynyl)-furylmethyl chrysanthemumate | 0.2 | 90 | 100 |
| 2-Methyl-5-propargyl-3-furylmethyl chrysanthemumate | 0.2 | 155 | 97 |
| Cyclopropanecarboxylate [I] (Compound No. 24) | 0.3 | 252 | 100 |
| 3-Phenoxy-α-ethynylbenzyl chrysanthemumate | 0.3 | 384 | 94 |
| 3-Phenoxybenzyl chrysanthemumate | 0.3 | 394 | 90 |
| Allethrin | 0.1 | 290 | 81 |

As seen in the above test results, the cyclopropanecarboxylates [I] exhibit a remarkably insecticidal activity against various harmful insects in sanitation, storage, agriculture, forest, food, packaging material, etc. Examples of harmful insects are housefly, mosquito, cockroach, green rice leafhopper, smaller brown planthopper, Japanese giant silk moth, cabbage butterfly, cabbage army worm, diamount back moth, purplish stem borer, tent caterpillar, etc. They also exhibit a repellency to some insects such as labybag. Since cyclopropanecarboxylates [I] are extremely less toxic to mammals, they can be used as insecticides in various fields with high safety.

For the insecticidal use, the cyclopropane carboxylates [I] may be employed as such but are usually extended with suitable carriers or diluents (e.g. benzene, toluene, xylene, ethylbenzene, kerosene, ethylene dibromide, dichlorodifluoromethane, n-hexanol, ethylene glycol, ethyl cellosolve, dioxane, methylethylketone, soybean flour, wood flour, sulfur, calcium lime, magnesium lime, diatomaceous earth, apatite, calcite, dolomite, gypum, mica, talc, pyrophyllite, clays, kaolinite, nacrite, dickite, anauxite, saponite, attapulgite, pumice, vermiculite, gelain, sodium alginate, polyvinyl alcohol, sodium laurylsulfate) to make conventional preparations (e.g. solution, emulsifiable concentration, wettable powder, dust, granule, gas, smoke, aerosol, paste) as in case of known pyrethroidal insecticides.

In an insecticidal composition, two or more of the cyclopropanecarboxylates [I] may be used in combination so as to produce an emhanced insecticidal activity. Further, the composition may contain a synergist for pyrethroids such as α-[2-(2-butoxyethoxy)ethoxy]-4,5-methylenedioxy-2-propyltoluene (piperonyl butoxide), 1,2-methylenedioxy-4-[2-(octylsulfinyl)propyl]benzene (sulfoxide), 4-(3,4-methylenedioxyphenyl)-5-methyl-1,3-dioxane (sufroxane), N-(2-ethylhexyl)bicyclo[2,2,1]hepta-5-ene-2,3-dicarboximide (MGX-264), octachlorodipropyl ether (S-421) or isobornyl thiocyanoacetate (thanite). Furthermore, a stabilizer such as phenol derivatives (e.g. BHT), bisphenol derivatives and arylamines may be incorporated into the composition.

In addition to the cyclopropanecarboxylate [I], the insecticidal composition may include any other physiologically active substance. Examples of such physiologically active substance are as follows: cyclopropanecarboxylate insecticides (e.g. pyrethrins, allethrin, N-(chrysanthemumoxymethyl)-3,4,5,6-tetrahydrophthalimide (tetramethrin), 5-benzyl-3-furylmethyl chrysanthemumate (resmethrin), 5-propargylfurfuryl chrysanthemumate), organic chlorinated insecticides (e.g. DDT, BHC, methoxychlor), organic phosphorus insecticides (e.g. 0,0-dimethyl-0-(3-methyl-4-nitrophenyl)-phosphorothioate ("Sumithion"), 0,0-dimethyl-0-(2,2-dichlorovinyl)-phosphate (DDVP), 0,0-dimethyl 0-[4-(methylthio)-m-tolyl]phosphorothioate (baycid), 0,0-dimethyl S-[1,2-di (ethoxycarbonyl)ethyl]phosphorodithioate (malathon), 0,0-dimethyl S-(phenyl ethoxycarbonylmethyl)-phosphorodithioate (papthion), 0,0-dimethyl-0-p-cyanophenylthiophosphate ("Cyanox"), 0,0-dimethyl 2,2,2-trichloro-1-hydroxyethyl phosphonate (dipterex), 0,0-diethyl 0-(2-isorpopyl-4-methyl-6-pyrimidinyl)phosphorothiate (diazinon)), carbamate insecticides (e.g. 1-naphthyl-N-methylcarbamate, 3,4-dimethylphenyl-N-methylcarbamate, 3,5-dimethylphenyl-N-methylcarbamate, 2-isopropoxyphenyl-N-methylcarbamate), other insecticides, fungicides, nematocides, acaricides, herbicides, fertilizers, etc.

According to the present invention, the cyclopropanecarboxylate [I] can be prepared by reacting an alcohol of the formula:

 [II]

wherein $R_3$ is as defined above or its functional derivative on the hydroxyl group with a cyclopropanecarboxylic acid of the formula:

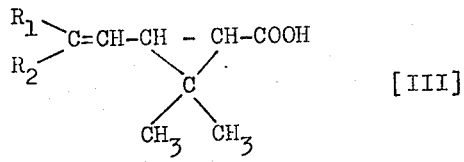 [III]

wherein $R_1$ and $R_2$ are each as defined above or its reactive derivative on the carboxyl group.

Examples of the alcohol [II] are as follows:
5-Benzyl-3-($\alpha$-ethynyl)-furylmethyl alcohol,
5-Thenyl-3-($\alpha$-ethynyl)-furylmethyl alcohol,
5-Furfuryl-3-($\alpha$-ethynyl)-furylmethyl alcohol,
5-Benzyl-2-($\alpha$-ethynyl)-thenyl alcohol,
3-Benzyl-$\alpha$-ethynylbenzyl alcohol,
5-Propargyl-$\alpha$-ethynylfurfuryl alcohol,
5-Propargyl-2-($\alpha$-ethynyl)-thenyl alcohol,
4-Propargyl-$\alpha$-ethnylbenzyl alcohol,
5-Allyl-$\alpha$-ethynylfurfuryl alcohol,
4-Allyl-$\alpha$-ethynylbenzyl alcohol,
2-Methyl-5-propargyl-3-($\alpha$-ethynyl)-furylmethyl alcohol,
4,5-Dimethyl-$\alpha$-ethynylfurfuryl alcohol,
4,5-Tetramethylene-$\alpha$-ethynylfurfuryl alcohol,
4,5-Trimethylene-2-($\alpha$-ethynyl)-thenyl alcohol,
3-Phenoxy-$\alpha$-ethynylbenzyl alcohol,
5-Phenoxy-2-($\alpha$-ethynyl)-thenyl alcohol,
5-Phenoxy-$\alpha$-ethynylfurfuryl alcohol,
3-Phenylthio-$\alpha$-ethynylbenzyl alcohol,
5-Chloro-6-phenylhexa-4-ene-1-yne-3-ol,
5-Chloro-6-(2'-thienyl)-hexa-4-ene-1-yne-3-ol,
5-Chloro-6-(2'-furyl)-hexa-4-ene-1-yne-3-ol, etc.

As the functional derivative of the alcohol [II], there may be exemplified a halide of the formula:

 [IIa]

wherein Y is halogen (e.g. chlorine, bromine) and $R_3$ is as defined above and a sulfonate of the formula:

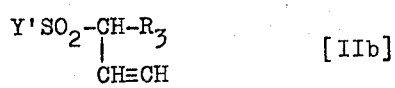 [IIb]

wherein Y' is lower alkyl (e.g. methyl, ethyl), phenyl or lower alkylphenyl (e.g. tolyl, xylyl) and $R_3$ is as defined above.

The halide [IIa] can be prepared by reacting the corresponding alcohol [II] with a halogenating agent such as thionyl halide or phosphorus halide. The sulfonate [IIb] can be prepared by reacting the corresponding alcohol [II] with a sulfonylating agent such as alkanesulfonyl halide or alkylbenzenesulfonyl halide.

As the cyclopropanecarboxylic acid [III], there may be exemplified the following compounds including their stereoisomers and optical isomers:

2,2-Dimethyl-3-(2'-methoxymethyl-1'-propenyl)-cyclopropanecarboxylic acid,
2,2-Dimethyl-3-(2'-ethoxymethyl-1'-propenyl)-cyclopropanecarboxylic acid,
2,2-Dimethyl-3-(2'-isopropyloxymethyl-1'-propenyl)cyclopropanecarboxylic acid,
2,2-Dimethyl-3-(2'-propargyloxymethyl-1'-propenyl)cyclopropanecarboxylic acid,
2,2-Dimethyl-3-(2'-allyloxymethyl-1'-propenyl)cyclopropanecarboxylic acid,
2,2-Dimethyl-3-(2'-acetyl-1'-propenyl)-cyclopropanecarboxylic acid,
2,2-Dimethyl-3-(2'-ethylcarbonyl-1'-propenyl)-cyclopropanecarboxylic acid,
2,2-Dimethyl-3-(2'-isopropylcarbonyl-1'-propenyl)cyclopropanecarboxylic acid,
2,2-Dimethyl-3-(2'-ethynylcarbonyl-1'-propenyl)cyclopropanecarboxylic acid,
2,2-Dimethyl-3-(2'-vinylcarbonyl-1'-propenyl)cyclopropanecarboxylic acid,
2,2-Dimethyl-3-(2'-propargylcarbonyl-1'-propenyl)cyclopropanecarboxylic acid,
2,2-Dimethyl-3-(2'-allylcarbonyl-1'-propenyl)-cyclopropanecarboxylic acid,
2,2-Dimethyl-3-(cyclopentanone-2'-ylidenemethyl)cyclopropanecarboxylic acid,
2,2-Dimethyl-3-(cyclohexanone-2'-ylidenemethyl)cyclopropanecarboxylic acid, etc.

These carboxylic acids can be readily converted into their reactive derivatives such as acid halides, acid anhydrides, alkali metal salts and organic tertiary amine salt by per se conventional procedures.

Depending on the kind of the alcohol [II] or its functional derivative, an appropriate kind of the carboxylic acid [III] or its reactive derivative to be reacted therewith may be selected.

When, for instance, the alcohol [II] itself is employed, it may be reacted with the cyclopropanecarboxylic acid [III] or its acid halide or acid anhydride.

In case of using the cyclopropanecarboxylic acid [II] itself, the reaction is usually carried out in the presence of a dehydrating agent (e.g. dicyclohexylcarbodiimide) in an inert solvent (e.g. benzene, petroleum ether) at a temperature from room temperature to the refluxing temperature.

In case of using the acid halide, the reaction is ordinarily effected in the presence of an acid eliminating agent such as an organic tertiary base (e.g. pyridine, triethylamine) in an inert solvent (e.g. benzene, toluene, petroleum benzene) at room temperature.

In case of using the acid anhydride, the reaction is normally performed in an inert solvent (e.g. benzene, toluene, petroleum benzene) at a temperature from room temperature to the refluxing temperature.

When the halide [IIa] is employed, it may be reacted with the alkali metal salt or organic tertiary amine salt of the cyclopropanecarboxylic acid [III]. Alternatively, the halide [IIa] may be reacted with the cyclopropanecarboxylic acid [III] in the presence of an organic tertiary amine. These reactions are usually carried out in an inert solvent (e.g. benzene, acetone) while heating.

When the sulfonate [IIb] is employed, it may be reacted with the alkali metal salt or organic tertiary amine salt of the cyclopropanecarboxylic acid [III]. Alternatively, the sulfonate [IIb] may be reacted with the cyclopropanecarboxylic acid [III] in the presence of an organic tertiary amine. These reactions are usually carried out in an inert solvent (e.g. benzene, acetone) while heating.

Some typical examples of the procedures for preparation of the cyclopropanecarboxylate [I] are as follows:

Procedure A:

The alcohol [II] (0.05 mol) is dissolved in a three times volume of dry benzene, and pyridine (0.075 mol) is added thereto. To the resulting solution, there is added a solution of the acid chloride of the cyclopropanecarboxylic acid [III] (0.053 mol) in a three times volume of dry benzene whereby an exothermic reaction proceeds. The reaction vessel is sealed and allowed to stand overnight. To the reaction mixture, a small amount of water is added to dissolve the precipitated pyridine hydrochloride, and the water layer is removed off. The organic layer is washed with 5% hydrochloric acid, an aqueous saturated solution of sodium hydrogencarbonate and an aqueous saturated solution of sodium chloride in order and dried over anhydrous sodium sulfate. The thus obtained benzene solution is treated with alumina for 30 minutes under stirring. The mixture is filtered, and the filtrate is concentrated under reduced pressure to give the cyclopropanecarboxylate [I].

Procedure B:

The alcohol [II] (0.05 mol) and the carboxylic acid [III] (0.05 mol) are dissolved in a six times volume of benzene, and dicyclohexylcarbodiimide (0.08 mol) is added thereto. The reaction vessel is sealed and allowed to stand overnight. The mixture is heated under reflux for 2 hours and then cooled. The precipitated dicyclohexylurea is removed off by filtration, and the filtrate is treated in the same manner as in Procedure A to give the cyclopropanecarboxylate [I].

Procedure C:

The alcohol [II] (0.05 mol) is dissolved in a three times volume of toluene, and the acid anhydride of the cyclopropanecarboxylic acid [III] (prepared from the corresponding cyclopropanecarboxylic acid and acetic anhydride) (0.05 mol) is added thereto. The resultant mixture is heated under reflux for 3 hours. The by-produced carboxylic acid is recovered by distillation under reduced pressure or neutralization with 5% aqueous solution of sodium hydroxide. The residual solution is treated in the same manner as in Procedure A to give the cyclopropanecarboxylate [I].

Procedure D:

The halide [IIa] (0.05 mol) and the cyclopropanecarboxylic acid [III] (0.06 mol) are dissolved in a three times volume of acetone. A solution of triethylamine (0.08 mol) in a three times volume of acetone is dropwise added thereto while stirring at 15° to 20°C, and the mixture is heated under reflux for 2 hours. After cooling, the precipitated triethylamine hydrochloride is removed off by filtration, and the filtrate is concentrated to remove the acetone. The residual solution is admixed with a three times volume of benzene and treated in the same manner as in Procedure A to give the cyclopropanecarboxylate [I].

Procedure E:

The sulfonate [IIb] (0.05 mol) is dissolved in a three times volume of acetone, and the sodium salt of the cyclopropanecarboxylic acid [III] (prepared from the corresponding cyclopropanecarboxylic acid and sodium hydroxide) (0.06 mol) is portionwise added thereto while stirring at room temperature. The mixture is heated under reflux for 30 minutes to complete the reaction. After cooling, the precipitated material is removed off by filtration, and the filtrate is concentrated to remove the acetone. The residue is dissolved in a three times volume of benzene and treated in the same manner as in Procedure A to give the cyclopropanecarboxylate [I].

Practical and presently preferred embodiments of the present invention are illustratively shown in the following Examples.

PART I

Preparation of the cyclopropanecarboxylate [I]:

Examples 1 to 17

The preparation of the cyclopropanecarboxylate [I] was carried out according to Procedures A to E. The results are shown in Table 4.

Table 4

| Ex. No. | Alcohol [II] or its functional derivative | Cyclopropane-carboxylic acid [III] or its reactive derivative | Procedure | Produced cyclopropanecarboxylate [I] | Yield (%) | Refractive index ($N_D^{25}$) | Elementary analysis (%) | | | |
|---|---|---|---|---|---|---|---|---|---|---|
| | | | | | | | C | H | S | Cl |
| 1 | 5-Benzyl-3-(α-ethynyl)-furylmethyl alcohol | 2,2-Dimethyl-3-(2'-methoxymethyl-1'-propenyl)-cyclopropanecarboxylic acid anhydride | C | 5-Benzyl-3-(α-ethynyl)-furylmethyl 2',2'-dimethyl-3-(2''-methoxymethyl-1''-propenyl)-cyclopropanecarboxylate | 85 | 1.5390 | F.: 76.81 C.: 76.50 (for $C_{25}H_{28}O_4$) | 7.24 7.19 | — — | — — |
| 2 | 5-Benzyl-2-(α-ethynyl)-thenyl alcohol | 2,2-Dimethyl-3-(2'-methoxymethyl-1'-propenyl)-cyclopropanecarboxylic acid | B | 5-Benzyl-2-(α-ethynyl)-thenyl 2',2'-dimethyl-3'-(2''-methoxymethyl-1''-propenyl)-cyclopropanecarboxylate | 84 | 1.5640 | F.: 73.40 C.: 73.50 (for $C_{25}H_{28}O_3S$) | 7.03 6.91 | 7.88 7.85 | — — |
| 3 | 3-Benzyl-α-ethynylbenzyl chloride | 2,2-Dimethyl-3-(2'-methoxymethyl-1'-propenyl)-cyclopropanecarboxylic acid | D | 3-Benzyl-α-ethynylbenzyl 2',2'-dimethyl-3'-(2''-methoxymethyl-1''-propenyl)-cyclopropanecarboxylate | 84 | 1.5578 | F.: 80.72 C.: 80.56 (for $C_{27}H_{30}O_3$) | 7.85 7.51 | — — | — — |
| 4 | 5-Propargyl-α-ethynylfurfuryl alcohol | 2,2-Dimethyl-3-(2'-methoxymethyl-1'-propenyl)-cyclopropanecarboxylic acid chloride | A | 5-Propargyl-α-ethynylfurfuryl 2',2'-dimethyl-3'-(2''-methoxymethyl-1''-propenyl)-cyclopropanecarboxylate | 87 | 1.5077 | F.: 74.13 C.: 74.09 (for $C_{21}H_{24}O_4$) | 7.03 7.11 | — — | — — |

Table 4 –Continued

| Ex. No. | Alcohol [II] or its functional derivative | Cyclopropane-carboxylic acid [III] or its reactive derivative | Procedure | Produced cyclopropanecarboxylate [I] | Yield (%) | Refractive index ($N_D^{25}$) | Elementary analysis (%) C | H | S | Cl |
|---|---|---|---|---|---|---|---|---|---|---|
| 5 | 4,5-Tetramethylene-α-ethynylfurfuryl alcohol | 2,2-Dimethyl-3-(2'-methoxymethyl-1'-propenyl)-cyclopropanecarboxylic acid chloride | A | 4,5-Tetramethylene-α-ethynlfurfuryl 2',2'-dimethyl-3'-(2''-methoxymethyl-1'-propenyl)-cyclopropanecarboxylate | 85 | 1.5164 | F.: 74.40<br>C.: 74.13<br>(for $C_{22}H_{28}O_4$) | 7.87<br>7.92 | —<br>— | —<br>— |
| 6 | 2-Methyl-5-propargyl-3-(α-ethynyl)-furylmethyl alcohol | 2,2-Dimethyl-3-(2'-methoxymethyl-1'-propenyl)-cyclopropanecarboxylic acid chloride | A | 2-Methyl-5-propargyl-3-(α-ethynyl)-furylmethyl 2',2'-dimethyl-3'-(2''-methoxymethyl-1''-propenyl)-cyclopropanecarboxylate | 88 | 1.5068 | F.: 74.57<br>C.: 74.55<br>(for $C_{22}H_{26}O_4$) | 7.35<br>7.39 | —<br>— | —<br>— |
| 7 | 3-Phenoxy-α-ethynyl-benzyl tosylate | Sodium 2,2-dimethyl-3-(2'-methoxymethyl-1'-propenyl)-cyclopropanecarboxylate | E | 3-Phenoxy-α-ethynylbenzyl 2',2'-dimethyl-3'-(2''-methoxymethyl-1''-propenyl)-cyclopropanecarboxylate | 92 | 1.5585 | F.: 77.46<br>C.: 77.20<br>(for $C_{26}H_{28}O_4$) | 6.80<br>6.98 | —<br>— | —<br>— |
| 8 | 5-Chloro-6-phenyl-hexa-4-ene-1-yne-3-ol | 2,2-Dimethyl-3-(2'-methoxymethyl-1'-propenyl)-cyclopropanecarboxylic acid chloride | A | 5-Chloro-6-phenyl-hexa-4-ene-1-yne-3-yl 2',2'-dimethyl-3'-(2''-methoxymethyl-1''-propenyl)-cyclopropanecarboxylate | 87 | 1.5320 | F.: 71.72<br>C.: 71.40<br>(for $C_{23}H_{27}O_3Cl$) | 7.18<br>7.03 | —<br>— | 9.11<br>9.16 |
| 9 | 5-Propargyl-α-ethynyl-furfuryl alcohol | 2,2-Dimethyl-3-(2'-ethoxymethyl-1'-propenyl)-cyclopropanecarboxylic acid chloride | A | 5-Propargyl-α-ethynylfurfuryl 2',2'-dimethyl-3'-(2''-ethoxymethyl-1''-propenyl)-cyclopropanecarboxylate | 87 | 1.5086 | F.: 74.69<br>C.: 74.55<br>(for $C_{22}H_{26}O_4$) | 7.37<br>7.39 | —<br>— | —<br>— |
| 10 | 5-Propargyl-α-ethynyl-furfuryl alcohol | 2,2-Dimethyl-3-(2'-propargyloxymethyl-1'-propenyl)-cyclopropanecarboxylic acid chloride | A | 5-Propargyl-α-ethynyl-furfuryl 2',2'-dimethyl-3'-(2''-propargyloxymethyl-1''-propenyl)-cyclopropanecarboxylate | 90 | 1.5088 | F.: 76.02<br>C.: 75.80<br>(for $C_{23}H_{24}O_4$) | 6.68<br>6.64 | —<br>— | —<br>— |
| 11 | 5-Propargyl-α-ethynyl-furfuryl alcohol | 2,2-Dimethyl-3-(2'-allyloxymethyl-1'-propenyl)-cyclopropanecarboxylic acid chloride | A | 5-Propargyl-α-ethynylfurfuryl 2',2'-dimethyl-3'-(2''-allyloxymethyl-1''-propenyl)-cyclopropanecarboxylate | 85 | 1.5100 | F.: 75.14<br>C.: 75.38<br>(for $C_{23}H_{26}O_4$) | 7.30<br>7.15 | —<br>— | —<br>— |
| 12 | 5-Benzyl-3-(α-ethynyl)-furylmethyl alcohol | 2,2-Dimethyl-3-(2'-acetyl-1'-propenyl)-cyclopropanecarboxylic acid chloride | A | 5-Benzyl-3-(α-ethynyl)-furylmethyl 2',2'-dimethyl-3'-(2''-acetyl-1''-propenyl)-cyclopropanecarboxylate | 89 | 1.5516 | F.: 76.77<br>C.: 76.90<br>(for $C_{25}H_{26}O_4$) | 6.59<br>6.71 | —<br>— | —<br>— |
| 13 | 5-Propargyl-α-ethynyl-furfuryl alcohol | 2,2-Dimethyl-3-(2'-acetyl-1'-propenyl)-cyclopropanecarboxylic acid chloride | A | 5-Propargyl-α-ethynylfurfuryl 2',2'-dimethyl-3'-(2''-acetyl-1''-propenyl)-cyclopropanecarboxylate | 88 | 1.5205 | F.: 74.61<br>C.: 74.53<br>(for $C_{21}H_{22}O_4$) | 6.56<br>6.55 | —<br>— | —<br>— |
| 14 | 2-Methyl-5-propargyl-3-(α-ethynyl)-furylmethyl alcohol | 2,2-Dimethyl-3-(2'-acetyl-1'-propenyl)-cyclopropanecarboxylic acid chloride | A | 2-Methyl-5-propargyl-3-(α-ethynyl)-furylmethyl 2',2'-dimethyl-3'-(2''-acetyl-1''-propenyl)-cyclopropanecarboxylate | 90 | 1.5202 | F.: 74.88<br>C.: 74.98<br>(for $C_{22}H_{24}O_4$) | 6.93<br>6.86 | —<br>— | —<br>— |
| 15 | 5-Propargyl-α-ethynyl-furfuryl alcohol | 2,2-Dimethyl-3-(2'-vinylcarbonyl-1'-propenyl)-cyclopropanecarboxylic acid chloride | A | 5-Propargy-α-ethynylfurfuryl 2',2'-dimethyl-3'-(2''-vinylcarbonyl-1''-propenyl)-cyclopropanecarboxylate | 87 | 1.5198 | F.: 75.35<br>C.: 75.41<br>(for $C_{22}H_{22}O_4$) | 6.38<br>6.33 | —<br>— | —<br>— |
| 16 | 5-Propargyl-α-ethynyl-furfuryl alcohol | 2,2-dimethyl-3-(2'-propargylcarbonyl-1'-propenyl)-cyclopropanecarboxylic acid chloride | A | 5-Propargyl-α-ethynylfurfuryl 2',2'-dimethyl-3'-(2''-propargylcarbonyl-1''-propenyl)-cyclopropanecarboxylate | 91 | 1.5220 | F.: 76.47<br>C.: 76.22<br>(for $C_{23}H_{22}O_4$) | 6.01<br>6.12 | —<br>— | —<br>— |
| 17 | 5-Propargyl-α-ethynyl-furfuryl alcohol | 2,2-Dimethyl-3-(cyclopentanone-2'-ylidenemethyl)-cyclopropenecarboxylic acid chloride | A | 5-Propargyl-α-ethynylfurfuryl 2',2'-dimethyl-3'-(cyclopentanone-2''-ylidenemethyl)-cyclopropanecarboxylate | 83 | 1.5357 | F.: 75.74<br>C.: 75.41<br>(for $C_{22}H_{22}O_4$) | 6.55<br>6.33 | —<br>— | —<br>— |

Note: F. = Found; C. = Calculated.

PART II

Preparation of the insecticidal composition containing the cyclopropanecarboxylate [I]:

Example A

The cyclopropanecarboxylate [I] (Compound No. 1, 2, 3, 5, 6, 9, 11, 12, 13, 20, 21, 23, 24, 25, 26, 28, 29, 30, 31, 32 or 33) (0.1 part by weight) was dissolved in kerosene (99.9 parts by weight) to make an oil preparation.

Example B

The cyclopropanecarboxylate [I] (Compound No. 4, 7, 8, 10, 14, 15, 16, 17, 18, 19, 22 or 27) (0.2 part by weight) was dissolved in kerosene (99.8 parts by weight) to make an oil preparation.

Example C

The cyclopropanecarboxylate [I] (Compound No. 1, 2, 3, 5, 6, 7, 9, 10, 11, 12, 13, 15, 20, 21, 23, 24, 25, 26, 28, 29, 30, 31, 32 or 33) (0.05 part by weight) and piperonyl butoxide (0.5 part by weight) were dissolved in kerosene (99.45 parts by weight) to make an oil preparation.

Example D

The cyclopropanecarboxylate [I] (Compound No. 4, 8, 14, 16, 17, 18, 19 or 27) (0.1 part by weight) and piperonyl butoxide (0.5 part by weight) were dissolved in kerosene (99.4 parts by weight) to make an oil preparation.

Example E

The cyclopropanecarboxylate [I] (Compound No. 1, 3, 5, 7, 11, 13, 15, 19, 21, 31 or 32) (0.1 part by weight) and DDVP (0.2 part by weight) were dissolved in kerosene (99.7 parts by weight) to make an oil preparation.

Example F

The cyclopropanecarboxylate [I] (Compound No. 1, 2, 3, 5, 6, 7, 9, 10, 11, 12, 13, 15, 20, 21, 23, 24, 25, 26, 28, 29, 30, 31, 32 or 33) (20 parts by weight), a surface active agent ("Sorpol SM-200"; manufactured by Toho Kagaku Co., Ltd.) (10 parts by weight) and xylene (70 parts by weight) were mixed together to make an emulsion preparation.

Example G

To the cyclopropanecarboxylate [I] (Compound No. 3) (0.4 part by weight), S-421 (2.0 parts by weight) was added. The resultant mixture was admixed with xylene (6 parts by weight) and deodorized kerosene (6.6 parts by weight) and charged in an aerosol vessel. The vessel was provided with a valve means, and an atomizer (liquefied petroleum gas) (85 parts by weight) was charged therein through the said valve means to make an aerosol preparation.

Example H

The cyclopropanecarboxylate [I] (Compound No. 5) (0.4 part by weight), piperonyl butoxide (2.0 parts by weight), xylene (6 parts by weight) and deodorized kerosene (6.6 parts by weight) were mixed together and charged in an aerosol vessel as in Example G to make an aerosol preparation.

Example J

The cyclopropanecarboxylate [I] (Compound No. 11) (0.3 part by weight), resmethrin (0.1 part by weight), thanite (2.0 parts by weight), xylene (6 parts by weight) and deodorized kerosene (6.6 parts by weight) were mixed together and charged in an aerosol vessel as in Example G to make an aerosol preparation.

Example K

The cyclopropanecarboxylate [I] (Compound No. 1) (0.2 part by weight), tetramethrin (0.2 part by weight), piperonyl butoxide (2 parts by weight), xylene (6 parts by weight) and deodorized kerosene (6.6 parts by weight) were mixed together and charged in an aerosol vessel as in Example G to make an aerosol preparation.

Example L

The cyclopropanecarboxylate [I] (Compound No. 21) (0.4 part by weight), Sumithion (0.5 part by weight), xylene (7 parts by weight) and deodorized kerosene (7.1 parts by weight) were mixed together and charged in an aerosol vessel as in Example G to make an aerosol preparation.

Example M

The cyclopropanecarboxylate [I] (Compound No. 32) (0.3 part by weight), tetramethrin (0.2 part by weight), piperonyl butoxide (2 parts by weight), deodorized kerosene (11.5 parts by weight) and an emulsifier ("Atmos 300"; manufactured by Atlas Chemical Co., Ltd.) (1 part by weight) were mixed together, and water (50 parts by weight) was added thereto. The resulting emulsion was charged with a 3:1 mixture of deodorized butane and deodorized propane (35 parts by weight) in an aerosol vessel to make a water base aerosol preparation.

Example N

The cyclopropanecarboxylate [I] (Compound No. 5 or 10) (0.6 g) was dissolved in methanol (20 ml), and the resultant solution was admixed uniformly with a carrier for mosquito coil consisting of Pyrethrum marc., Tabu powder and wood powder in a weight ratio of 5:3:1 (99.4 g). After evaporation of methanol, the residue was kneaded well with water (150 ml), shaped and dried to make a mosquito coil.

Example O

The cyclopropanecarboxylate [I] (Compound No. 5) (0.3 g) and allethrin (0.3 g) were dissolved in methanol (20 ml), and the resulting solution was treated as in Example N to make a mosquito coil.

Example P

A sheet of asbestos of 2.5 cm in length, 1.5 cm in width and 0.3 mm in thickness was dipped in a solution of the cyclopropanecarboxylate [I] (Compound No. 21) (0.2 g) and 5-propargylfurfuryl chrysanthemumate (0.05 g) in chloroform to make an insecticidal fumigant preparation which was used by heating on a hot plate.

Example Q

The cyclopropanebarboxylate [I] (Compound No. 1, 3, 5, 6, 11 or 18) (5 parts by weight), sodium ligninsulfonate ("Toyolignin OT"; manufactured by Toyo Boseki Kabushiki Kaisha) (5 parts by weight) and clay ("GSM clay"; manufactured by Zieclite Kogyo Co., Ltd.) (90 parts by weight) were mixed well. The resulting mixture was admixed with water, granulated and dried to give a granule preparation.

Example R

The cyclopropanecarboxylate [I] (Compound No. 1, 3, 4, 6, 9, 11, 14, 15, 17, 19, 20 or 21) (1 part by weight), piperonyl butoxide (3 parts by weight), acetone (20 parts by weight) and 300 mesh diatomaceous earth (96 parts by weight) were mixed well and the acetone was evaporated therefrom to make a dust preparation.

Example S

The cyclopropanecarboxylate [I] (Compound No. 5) (20 parts by weight), 1-naphthyl-N-methylcarbamate (5 parts by weight), an emulsifier ("Sorpol SM-200") (5 parts by weight) and 300 mesh talc (70 parts by weight) were mixed well to make a wettable powder preparation.

Example T

The cyclopropanecarboxylate [I] (Compound No. 1, 3, 5 or 32) (5 parts by weight), sumithion (25 parts by weight), an emulsifier ("Sorpol SM-200") (15 parts by weight) and xylene (55 parts by weight) were mixed well to make an emulsion preparation.

Example U

The cyclopropanecarboxylate [I] (Compound No. 1, 3, 5, 21 or 32) (20 parts by weight), salithion (10 parts by weight), an emulsifier ("Sorpol SM-200") (10 parts by weight) and xylene (60 parts by weight) were mixed well to make an emulsion preparation.

Example W

The cyclopropanecarboxylate [I] (Compound No. 1, 2, 3, 5, 21 or 32) (20 parts by weight), thianox (20 parts by weight), an emulsifier ("Sorpol SM-200") (10 parts by weight) and xylene (50 parts by weight) were mixed well to make an emulsion preparation.

Example Y

The cyclopropanecarboxylate [I] (Compound No. 1, 3, 5, 21 or 32) (20 parts by weight) was admixed with galechron (10 parts by weight), an emulsifier ("Sorpol SM-200") (10 parts by weight) and xylene (60 parts by weight). The resulting mixture was agitated well to make an emulsion preparation.

PART III

Insecticidal effect of the insecticidal composition containing the cyclopropanecarboxylate [I]:

Example I

The oil preparation obtained as in Example A, B, C, D or E (5 ml) was sprayed by the use of a Campbell's turn table [Soap & Sanitary Chemicals, Vol. 14, No. 6, 119 (1938)] on 100 adults of housefly, and the houseflies were exposed under the spray for 10 minutes. The houseflies were then allowed to stand with feeding. On the next day, the death of more than 80% was confirmed.

Example II

The emulsion preparation obtained as in Example F was diluted with water to make a 20,000 fold dilution. The dilution (2 liters) was charged in a case of 23 cm in length, 30 cm in width and 6 cm in depth, and 100 larvae of mosquito were released therein. On the next day, the death of more than 90% was confirmed.

Example III

The granule preparation obtained as in Example Q (1 g) was added to water (10 liters) charged in a 14 liter volume bucket. After one day, 100 larvae of mosquito were released therein. Within 24 hours thereafter, more than 90% of the mosquitos was dead.

Example IV

The insecticidal potency of the aerosol preparation obtained as in Example G, H, J, K, L or M against adults of housefly was tested according to the method as described in Soap & Chemical Specialties Bluebook (1965). The results are shown in Table 5.

Table 5

| Test composition | Amount sprayed (g/1000 ft³) | Knockdown percent (%) | | | Percent death (%) |
|---|---|---|---|---|---|
| | | 5 min. | 10 min. | 15 min. | |
| Example G | 3.0 | 17 | 45 | 90 | 82 |
| Example H | 2.9 | 32 | 64 | 92 | 80 |
| Example J | 3.1 | 15 | 50 | 95 | 91 |
| Example K | 3.0 | 30 | 71 | 91 | 78 |
| Example L | 3.2 | 23 | 56 | 93 | 90 |
| Example M | 3.2 | 31 | 72 | 96 | 81 |

Example V

In a glass chamber of 70 cm cube, 50 adults of mosquito were released. A small electric fun of 13 cm in diameter equipped in the chamber was driven, and the mosquito coil obtained as in Example N or O (0.5 g) was ignited at both ends and placed therein. More than 80% of the mosquitos was knocked down within 20 minutes.

Example VI

In a glass chamber of 70 cm cube, 50 adults of housefly were released. A small electric fun of 13 cm in diameter equipped in the chamber was driven, and the fumigant preparation obtained as in Example P was placed on an hot plate therein. More than 80% of the mosquitos was knocked down within 20 minutes.

Example VII

The dust preparation obtained as in Example R was uniformly dispersed on a petri dish of 14 cm in diameter to make a layer in the rate of 2 g/m² on the bottom. On the wall of the petri dish, butter was applied remaining about 1 cm from the bottom. Ten adults of cockroach were released therein and contacted with the petri dish for 60 minutes. More than 80% of the cockroachs was knocked down. Three days after the contact, more than 70% of the knockdown cockroachs was dead.

Example VIII

The dust preparation obtained as in Example R (100 mg) was admixed with rice (100 g), and the resultant mixture was placed in a 100 ml volume flask. In the flask, there were released 50 rice weevils, and a lid was placed thereon. After 1 week, more than 80% of the rice weevils was killed.

Example IX

The emulsion preparation obtained as in Example F or the wettable powder preparation obtained as in Example S was diluted with water to make a 200 fold dilution. The dilution (10 ml) was sprayed on rice plants cultivated for 45 days after seeding in a 1/50,000 Wagner pot. Then, the pot was covered with a net, and 30 adults of green rice leafhopper were released therein. After 1 day, more than 80% of the green rice leafhoppers was killed.

Example X

In a glass dish of 14 cm in diameter, 10 larvae of cabbage army worm were released. The emulsion preparation obtained as in Example F containing the cyclopropanecarboxylate [I] (Compound No. 1, 2, 3, 5, 9, 11, 13, 15, 20, 21, 24 or 32) or the emulsion preparation obtained as in Example T, U, W or Y was diluted with water to make a 400 fold dilution. The dilution (1 ml) was sprayed on the cabbage army worms. After 2 days, more than 90% of the cabbage army worms was killed.

Example XI

Many green peach aphid (Myzus persicae) were made parasitic on cabbage seedlings grown for 1 month after seeding. The emulsion preparation obtained as in Example F, T, U or W was diluted with water to make a 200 fold dilution, and the dilution (3 ml) was sprayed on the plants by the use of a turn table. After one day, more than 80% of the green peach aphids was killed.

Example XII

The emulsion preparation obtained as in Example F was diluted with water to make 50 fold and 200 fold dilutions. Tomato seedlings elapsed 1 month after seeding were dipped in the said dilutions for 1 month. After drying in atmosphere, the plants were placed in a plastic vessel with a lid, and larger potato lady beetles (Epilachna vigintioctopunctata) were released in the vessel. After 5 days, more than 80% of the insects was dead in the group applied with the 50 fold dilution. In the group applied with the 200 fold dilution, most of the insects were alive but a marked repellency was observed.

What is claimed is:

1. A cyclopropanecarboxylate of the formula:

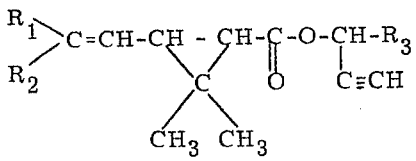

wherein $R_1$ is methyl, $R_2$ is lower alkoxymethyl, lower alkenoxymethyl, lower alkynoxymethyl or acyl selected from lower alkanoyl, lower alkenylcarbonyl or lower alkynylcarbonyl or, when taken together with the adjacent carbon atom, $R_1$ and $R_2$ may represent a cyclic ketone group having 4 to 6 carbon atoms and $R_3$ is a group of the formula:

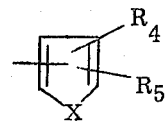

wherein $R_4$ is lower alkyl, lower alkenyl, lower alkynyl, benzyl, thenyl, furylmethyl, phenoxy or phenylthio, $R_5$ is hydrogen or lower alkyl or $R_4$ and $R_5$ may link together to form a polymethylene chain having 3 to 4 carbon atoms and X is oxygen, sulfur or vinylene, or a group of the formula:

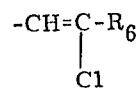

wherein $R_6$ is benzyl, thenyl or furylmethyl.

2. The cyclopropane carboxylate of claim 1, wherein $R_2$ is methoxymethyl, ethoxymethyl, propoxymethyl, allyloxymethyl, pentenyloxymethyl, propargyloxymethyl, acetyl, propionyl, butyryl, allylcarbonyl or propargylcarbonyl.

3. The cyclopropane carboxylate of claim 2, wherein $R_2$ is methoxymethyl, ethoxymethyl, or propoxymethyl.

4. The cyclopropane carboxylate of claim 2, wherein $R_2$ is allyloxymethyl or pentenyloxymethyl.

5. The cyclopropane carboxylate of claim 2, wherein $R_2$ is propargyloxymethyl.

6. The cyclopropanecarboxylate according to claim 1, wherein $R_2$ is lower alkoxymethyl.

7. The cyclopropane carboxylate of claim 2, wherein $R_2$ is acetyl, propionyl or butyryl.

8. The cyclopropane carboxylate of claim 2, wherein $R_2$ is allylcarbonyl.

9. The cyclopropane carboxylate of claim 2, wherein $R_2$ is propargylcarbonyl.

10. The cyclopropane carboxylate of claim 1, wherein $R_1$ and $R_2$ represent a cyclic ketone group having 4 to 6 carbon atoms therein.

11. The cyclopropane carboxylate of claim 1, wherein $R_3$ is a group of the formula

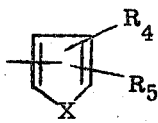

12. The cyclopropane carboxylate of claim 11, wherein $R_4$ is methyl, ethyl, propyl, allyl, pentenyl, propargyl, benzyl, thenyl, furylmethyl, phenoxy or phenylthio.

13. The cyclopropane carboxylate of claim 12, wherein $R_4$ is methyl, ethyl or propyl.

14. The cyclopropane carboxylate of claim 12, wherein $R_4$ is allyl or pentenyl.

15. The cyclopropane carboxylate of claim 12, wherein $R_4$ is propargyl.

16. The cyclopropane carboxylate of claim 11, wherein $R_5$ is hydrogen.

17. The cyclopropane carboxylate of claim 11, wherein $R_5$ is a lower alkyl.

18. The cyclopropane carboxylate of claim 17, wherein said lower alkyl is methyl, ethyl or propyl.

19. The cyclopropane carboxylate of claim 11, wherein $R_4$ and $R_5$ are linked together to form a polymethylene chain having 3 to 4 carbon atoms.

20. The cyclopropane carboxylate of claim 11, wherein X is oxygen.

21. The cyclopropane carboxylate of claim 11, wherein X is sulfur.

22. The cyclopropane carboxylate of claim 11, wherein X is vinylene.

23. The cyclopropane derivative of claim 1, wherein $R_3$ has the formula

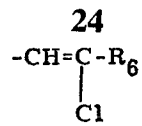

24. The cyclopropane derivative of claim 23, wherein $R_6$ is benzyl.

25. The cyclopropane derivative of claim 23, wherein $R_6$ is furylmethyl.

26. A cyclopropanecarboxylate of the formula:

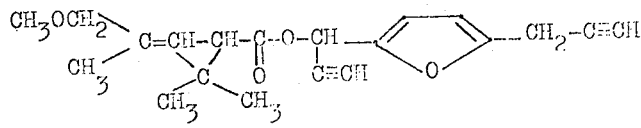

* * * * *

UNITED STATES PATENT OFFICE
CERTIFICATE OF CORRECTION

Patent No. 3,862,174  Dated January 21, 1975

Inventor(s) Toshio MIZUTANI, et al

It is certified that error appears in the above-identified patent and that said Letters Patent are hereby corrected as shown below:

Title page, insert the following:

[30]    Foreign Application Priority Data

June 25, 1971       Japan ...... 46689/1971

Signed and sealed this 6th day of May 1975.

(SEAL)
Attest:

RUTH C. MASON
Attesting Officer

C. MARSHALL DANN
Commissioner of Patents
and Trademarks